United States Patent
Hill et al.

(10) Patent No.: US 11,175,047 B2
(45) Date of Patent: *Nov. 16, 2021

(54) PELLET STOVE

(71) Applicants: Richard L. Hill, Sparks, NV (US);
Don P. Alexander, Sparks, NV (US)

(72) Inventors: Richard L. Hill, Sparks, NV (US);
Don P. Alexander, Sparks, NV (US)

(*) Notice: Subject to any disclaimer, the term of this patent is extended or adjusted under 35 U.S.C. 154(b) by 195 days.

This patent is subject to a terminal disclaimer.

(21) Appl. No.: 16/553,922

(22) Filed: Aug. 28, 2019

(65) Prior Publication Data

US 2019/0383491 A1 Dec. 19, 2019

Related U.S. Application Data

(63) Continuation-in-part of application No. 15/729,723, filed on Oct. 11, 2017, now Pat. No. 10,408,459,
(Continued)

(51) Int. Cl.
*F24B 13/04* (2006.01)
*F24B 13/02* (2006.01)
(Continued)

(52) U.S. Cl.
CPC ............. *F24B 13/04* (2013.01); *F23B 50/00* (2013.01); *F23B 50/12* (2013.01); *F23B 60/02* (2013.01);
(Continued)

(58) Field of Classification Search
CPC .......... F24B 13/04; F24B 1/024; F24B 50/00; F24B 50/12; F24B 50/04; F24B 50/08;
(Continued)

(56) References Cited

U.S. PATENT DOCUMENTS

| 4,257,338 A | 3/1981 | Chasek |
| 7,861,707 B2 | 1/2011 | Wisener |

(Continued)

FOREIGN PATENT DOCUMENTS

| CN | 88101057 A | * | 9/1988 |
| CN | 105091032 A | * | 11/2015 |

(Continued)

OTHER PUBLICATIONS

Wiseway Non-Electric Pellet stove, www.wisewaypelletstove.com, 2012.

(Continued)

*Primary Examiner* — Daniel J Colilla
(74) *Attorney, Agent, or Firm* — William H. Eilberg

(57) ABSTRACT

A pellet stove includes a hopper for storing pellets, a basket for receiving the pellets by gravity, a duct for conveying combustion air to the basket, and a conduit for conducting heated air away from the basket. The position of the basket is adjustable, such as by raising and lowering it, or by rotating it, so as to control the number of pellets in the area of most intense combustion. One or more optional burn plates, positioned below the basket, provide platforms on which pellets falling through the basket can burn down to a smaller size. The pellet stove requires no external source of power. The stove so constructed enables quiet, efficient and clean burning of the pellets.

4 Claims, 8 Drawing Sheets

Related U.S. Application Data which is a continuation of application No. 14/955,189, filed on Dec. 1, 2015, now Pat. No. 9,845,957.

(60) Provisional application No. 62/088,366, filed on Dec. 5, 2014.

(51) Int. Cl.
| | |
|---|---|
| *F24B 1/08* | (2021.01) |
| *F23B 50/00* | (2006.01) |
| *F23B 50/12* | (2006.01) |
| *F23B 60/02* | (2006.01) |
| *F23B 30/02* | (2006.01) |
| *F23H 17/06* | (2006.01) |
| *F24B 1/02* | (2006.01) |
| *F23H 1/06* | (2006.01) |
| *F23J 1/00* | (2006.01) |

(52) U.S. Cl.
CPC ............... *F23H 1/06* (2013.01); *F23H 17/06* (2013.01); *F23J 1/00* (2013.01); *F24B 1/024* (2013.01); *F24B 13/02* (2013.01)

(58) Field of Classification Search
CPC .... F24B 50/10; F24B 1/00; F24B 1/38; F24B 40/08; F24B 13/00; F24B 1/028; F24B 13/02; F23H 1/06; F23B 50/00; F23B 50/10; F23B 50/12; F23K 3/16; F23N 2239/02

See application file for complete search history.

(56) References Cited

U.S. PATENT DOCUMENTS

| | | |
|---|---|---|
| 8,020,547 B2 | 9/2011 | Hepper |
| 2007/0186920 A1* | 8/2007 | Wisener ................... F23B 50/00 126/77 |
| 2010/0037806 A1 | 2/2010 | Duignan |
| 2011/0048398 A1 | 3/2011 | Christensen |
| 2015/0292746 A1* | 10/2015 | Bowers ................... F24B 5/026 126/75 |
| 2017/0082292 A1 | 3/2017 | Amlin |

FOREIGN PATENT DOCUMENTS

| | | | | |
|---|---|---|---|---|
| EP | 2698580 A1 * | 2/2014 | .......... | A47J 37/0718 |
| JP | 2008-215719 A | 9/2008 | | |
| JP | 2012-073012 A | 4/2012 | | |
| JP | 2012-241981 A | 12/2012 | | |

OTHER PUBLICATIONS

Clarry Pellet Stove, www.clarrypelletstove.com.
Riley Pellet Stove, www.rileycampstoves.com/pelletstoves.html.

* cited by examiner

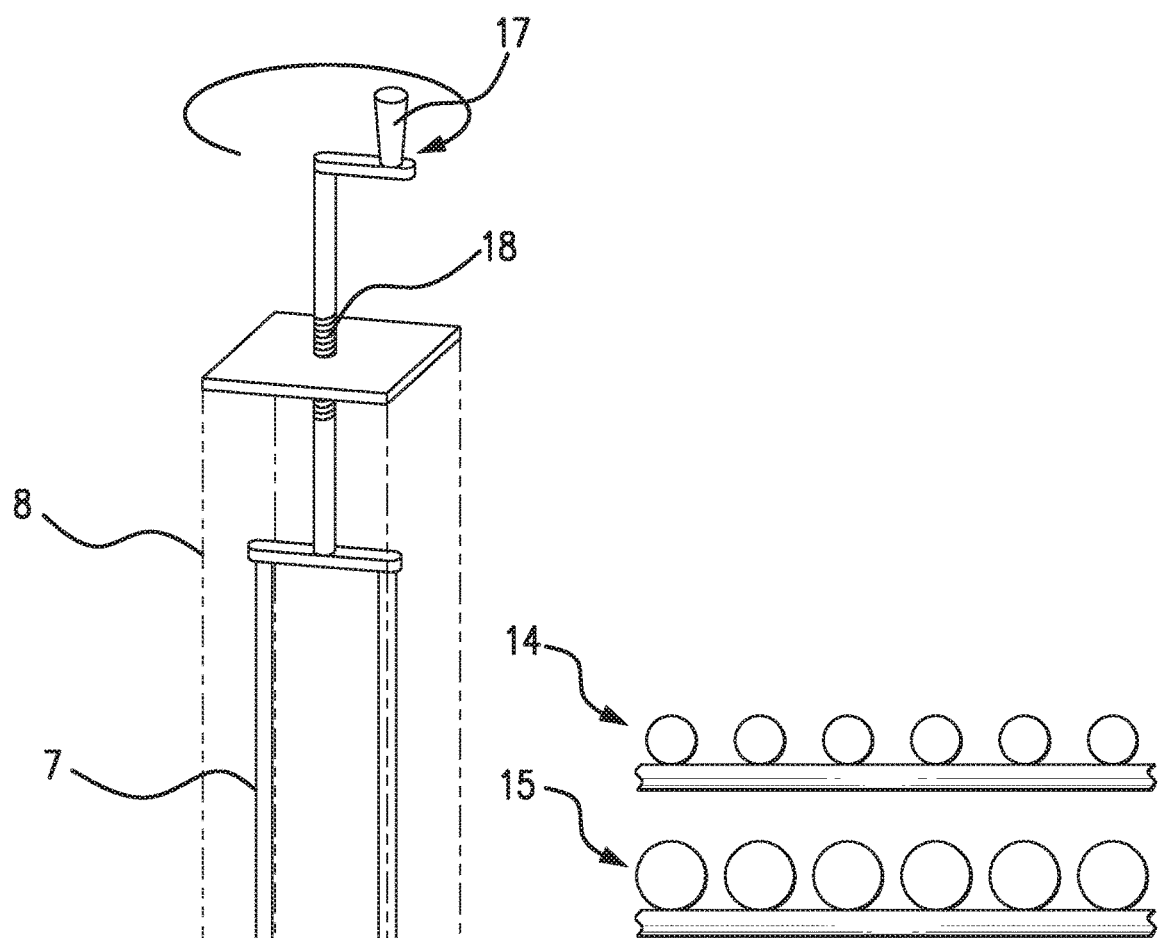
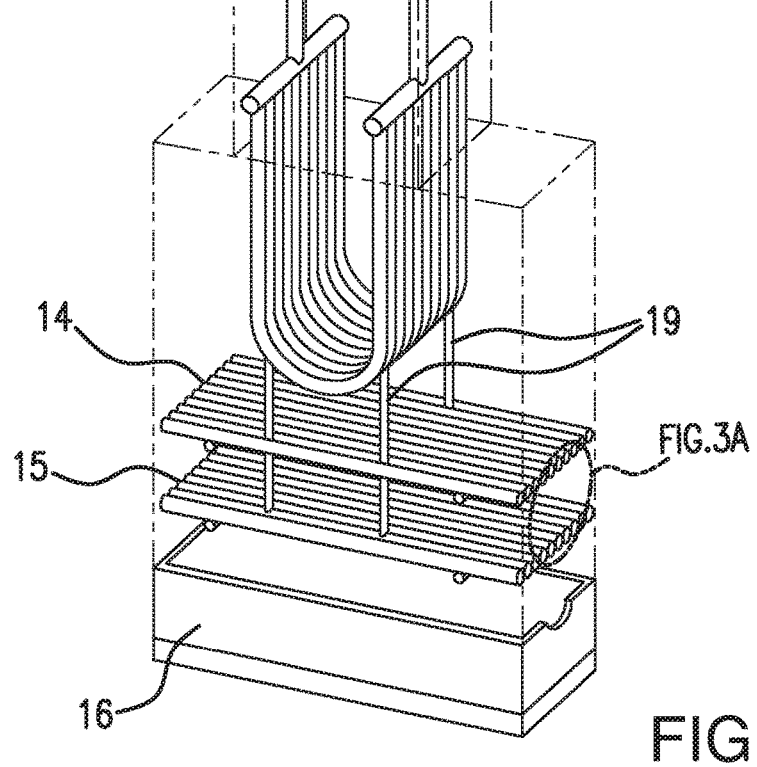
FIG. 3A
FIG. 3

PELLET STOVE

CROSS-REFERENCE TO RELATED APPLICATIONS

This is a continuation-in-part of U.S. patent application Ser. No. 15/729,723, filed Oct. 11, 2017, which is a continuation of U.S. patent application Ser. No. 14/955,189, filed Dec. 1, 2015, which claims the priority of U.S. Provisional Patent Application Ser. No. 62/088,366, filed Dec. 5, 2014, the entire disclosure of which is hereby incorporated by reference.

FIELD OF THE INVENTION

The present invention relates to pellet stoves and the like.

BACKGROUND OF THE INVENTION

Pellet stoves are operated in many domestic, commercial, and industrial premises as a heating source. Pellet stoves burn fuel in the form of pellets. The pellets are made of ground up wood, which is dried to a low moisture content (approximately 8%), and then pressed into pellet shapes. The pellets are typically approximately 0.25 inches in diameter, and may range up to about one inch long, though other pellet sizes are possible. The pressing process creates heat that brings the natural resin of the wood to the outer shell of the pellets. This natural resin is the bonding agent that maintains the ground up wood in a pellet shape.

There are hardwood and softwood pellets with different grades of pellets in both hardwood and softwood. Hardwood pellets typically create more ash and do not burn any hotter than softwood pellets. Lesser grades of pellets usually create less heat, more ash, and more pollution.

For pellet fuel to burn completely with the least amount of emissions, air must be passed over the burning pellets to create enough heat to penetrate the natural resin located on the outside of the pellet. If insufficient air is passed over the burning pellets, the burn temperature drops, the pellets smolder and smoke, and the pellets may eventually be extinguished.

Pellet stoves have many advantages over conventional wood stoves and other heating sources. The primary advantage is their low emissions. The U.S. Environmental Protection Agency (EPA) has issued new regulations for wood burning stoves, and many existing wood burning stoves will not comply with the new regulations. In addition, many local government entities are trying to reduce dramatically the number of wood stoves due to pollution concerns.

Pellet stoves fall into two main categories, namely, electrically powered pellet stoves and natural draft gravity-fed pellet stoves. An electrically powered pellet stove uses an electrically powered auger to transport the pellets from a hopper to a burn chamber. Being powered, such stoves can utilize additional powered devices such as fans to ensure sufficient air flow. Powered pellet stoves have several disadvantages, as compared with gravity-fed systems, including the noise of the fan and auger motor, the cost of replacement parts, down time to replace components, and the inability to work during power outages.

A natural draft gravity-fed pellet stove includes a hopper that stores a large number of pellets. These pellets funnel downwards, by gravity, towards a primary burn chamber. The burn chamber exposes the lowest pellets to an air flow, provided by an exhaust/heat tube. Pellets are lit in the primary burn chamber and burn until they reduce in size and fall through the rods or other members defining the burn chamber. A secondary burn chamber, typically a perforated plate, is located below the primary burn chamber and catches the partially burnt pellets, which continue to burn until they turn to ash, which falls through the perforations into an ash chamber below. As the pellets burn and fall from the primary burn chamber they are replaced by pellets falling through from the hopper.

For gravity-fed stoves, also referred to herein as natural draft stoves, manufacturers typically have no control over the amount of pellets that are in their primary burn chamber. Stove manufacturers typically regulate the heat output by controlling how much air passes over the burning pellets in the primary burn chamber. The amount of air movement in a natural draft pellet stove is very small when air passing over the pellets is restricted and the heat is reduced for a low temperature burn.

The low air movement of the natural draft is very fragile and it is easy to interrupt the draft, causing the pellets to smoke, smolder, and become extinguished. This creates challenges for doing a controlled and sustained low heat burn. With no control over the amount of burning pellets that are exposed to the moving air, most stove manufacturers rely on spacing in the primary burn chamber to regulate how fast the pellets drop into the primary burn chamber, burn down to a specific size, then drop down to the secondary burn plate where they finish burning to a specific size and drop down to the ash pan.

Using spacing to regulate how fast the pellets move through the primary burn chamber creates several challenges. A first challenge is that a stove that is calibrated with primary burn chamber spacing set to burn and drop a given amount of pellets to reach a given temperature on a high temperature burn at sea level will lose about 100 degrees of heat exhaust output when the same stove is moved to a 5,000 foot elevation. Also, such stove will burn much cooler due to the fact that there is less oxygen in the air.

A second challenge is created from the number of pellets that drop down onto the secondary burn plate. The secondary burn plate is typically a flat plate with holes and or slots cut in to allow the pellets to burn down to a much smaller size (hopefully ash) before dropping down to the ash pan. Pellets typically spend more time on the secondary burn plate than they do in the primary burn chamber. This creates a backup on the secondary burn plate and over a longer burn, the secondary burn plate backs up with unburned pellets. This backup of unburned pellets restricts the draft and/or plugs up the stove, so that the pellets begin to smoke, smolder, and eventually become extinguished.

If larger holes and/or slots are cut in the secondary burn plate, the pellets do not finish burning before dropping into the ash pan. Once the pellets drop into the ash pan they typically become extinguished due to the fact that there is less air movement and less heat in the ash pan. When the pellets fail to burn completely in the ash pan, the stove produces less heat, and the efficiency of using pellet fuel decreases.

An additional challenge comes from where the manufacturers of many natural draft gravity-fed stoves locate the secondary burn plate. The secondary burn plate is usually located about two inches below the primary burn chamber to create more space for pellet buildup on the secondary burn plate. If the secondary burn plate is located lower to allow for greater build up, the secondary plate is farther from the hottest part of the stove and is exposed to less air movement. This causes the pellets to burn more slowly, spending more time on the secondary burn plate. More time spent on the secondary burn plate contributes to pellet buildup which contributes to restricting the draft and/or clogging the stove, causing the pellets to smoke, smolder, and become extinguished.

What is therefore needed is an improved arrangement for enhancing the efficiency and control of a pellet stove.

SUMMARY OF THE INVENTION

The present invention comprises a pellet stove, having a hopper or other means for storing pellets, an adjustable basket which receives the pellets, by gravity, from the hopper, a means for conveying air to the vicinity of the basket to support combustion of pellets therein, and means for conducting heated air away from the basket.

In one embodiment, the basket is adjusted by moving it up or down. In another embodiment, the basket is rotated. In either case, movement of the basket effectively varies the number of pellets located in the region of the most intense combustion, and therefore regulates the amount of heat produced by the stove.

The stove also includes a secondary burn plate, and, optionally, a tertiary burn plate, disposed below the basket. Both burn plates are formed of spaced-apart bars, or other members, such that pellets which fall onto the plates fall through the spaces when they burn down to a sufficiently small size. The spacing of the bars of the tertiary burn plate, if provided, is preferably smaller than the spacing of the bars of the secondary burn plate. The latter arrangement tends to insure that the residue of the pellets, falling through the tertiary burn plate into an ash tray placed below same, will comprise very small particles, equivalent to ash.

In another preferred embodiment, there are no burn plates. In this case, the residue of the pellets simply falls through the members defining the basket. Such residue can be collected in an ash tray or ash pan, placed below the basket, or the ash tray could be omitted, in which case the residue falls to the bottom of a burn chamber.

In another preferred embodiment, a slide having an inclined surface deflects pellets falling from the hopper, or from a transfer tube leading from the hopper, onto the basket. This arrangement tends to insure that the falling pellets will arrive at the desired location. Also, the secondary burn plate may include an angled portion, which similarly directs falling pellets into a desired location on the secondary burn plate.

In another preferred embodiment, the slide is omitted, and the pellets drop into the basket, from a hopper or other storage device, located above the basket.

The invention also includes a method of operating a pellet stove, the method comprising allowing a plurality of pellets to fall, by gravity, from a hopper onto a basket, the basket having a position which is adjustable, igniting the pellets in the basket, and adjusting the position of the basket so as to control the amount of heat produced by the stove. The adjusting step can comprise either moving the basket up or down, or rotating the basket.

The present invention therefore has a primary object of providing a pellet stove in which the burn rate of the pellets can be controlled.

The invention has the further object of improving the efficiency of a pellet stove.

The invention has the further object of providing a pellet stove having reduced emissions of pollutants.

The invention has the further object of reducing the amount of maintenance required in a pellet stove.

The invention has the further object of providing a pellet stove which can work well at various altitudes.

The reader skilled in the art will recognize other objects and advantages of the present invention, from a reading of the following brief description of the drawings, the detailed description of the invention, and the appended claims.

BRIEF DESCRIPTION OF THE DRAWINGS

FIG. 3 is a perspective view of the essential components of the burn chamber, according to the embodiment of FIGS. 1 and 2.

FIG. 3A provides a detailed end view of a portion of the structure of FIG. 3, showing the differences in bar spacing between the secondary burn plate and the tertiary burn plate.

DETAILED DESCRIPTION OF THE INVENTION

Figure 1:
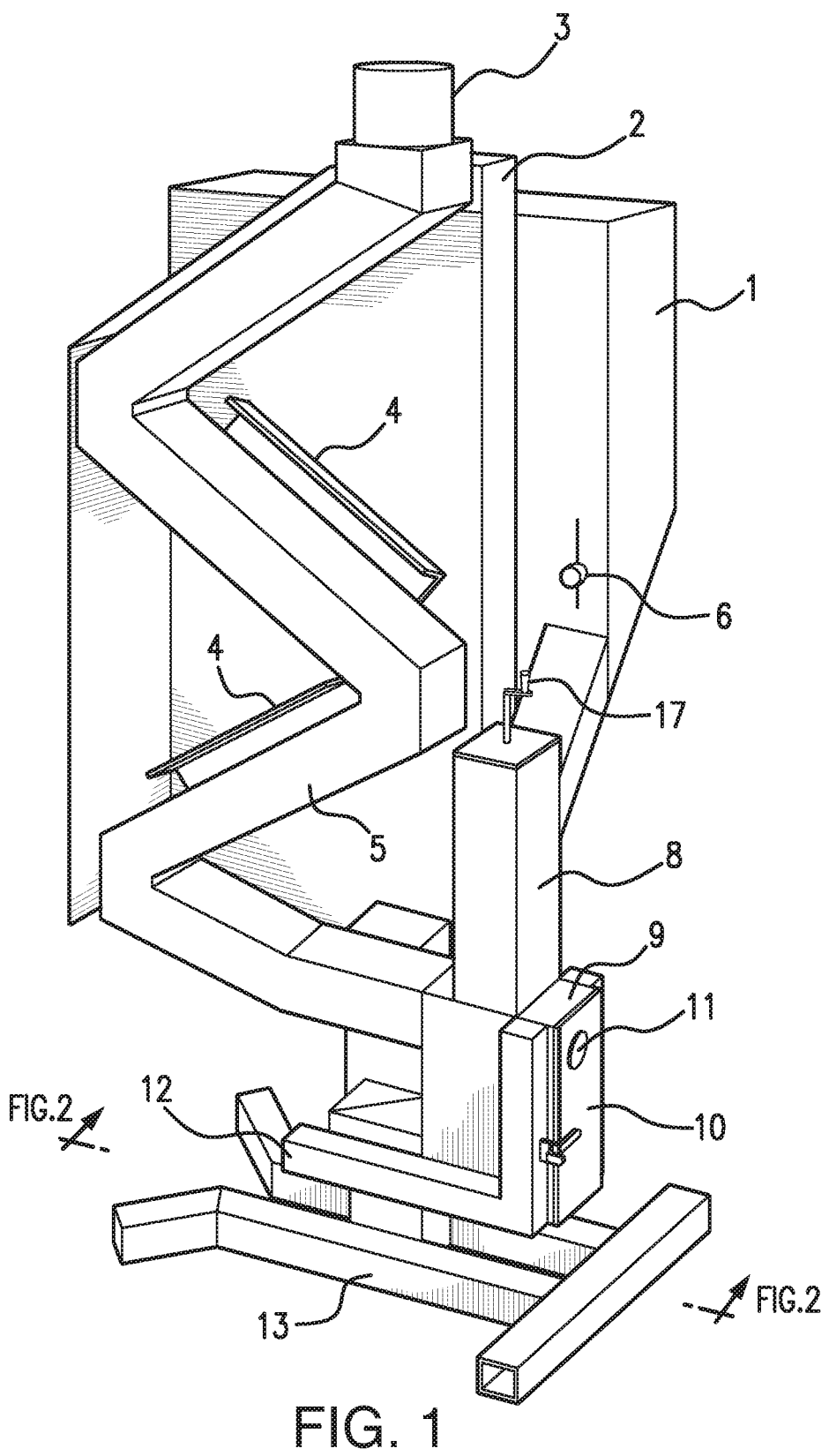
FIG. 1 is a perspective view of one embodiment of the pellet stove of the present invention.

In one aspect, the present invention comprises a gravity-fed pellet stove which comprises a primary burn basket. The position of the primary burn basket is adjustable, so as to vary the quantity of fuel pellets located within the primary burn basket, which are exposed to an air flow through the burn chamber.

In another aspect, the present invention comprises a gravity-fed pellet stove which comprises a primary burn basket, and a secondary burn plate disposed beneath the primary burn basket. The spacing between the primary burn basket and the secondary burn plate may be variable or fixed.

In another aspect, the present invention comprises a gravity-fed pellet stove which comprises a primary burn basket, and a secondary burn plate disposed beneath the primary burn basket. The secondary burn plate may comprise a plurality of parallel bars. The spacing of the bars may be adjustable, for example by replacing a first secondary burn plate having a particular bar spacing with a second secondary burn plate having a different bar spacing.

In another aspect, the present invention comprises a gravity-fed pellet stove which comprises a primary burn basket, a secondary burn plate beneath the primary burn basket, and a tertiary burn plate beneath the secondary burn plate.

The above description sets forth, rather broadly, a summary of one embodiment of the present invention so that the detailed description that follows may be better understood and contributions of the present invention to the art may be better appreciated. Some of the embodiments of the present invention may not include all of the features or characteristics listed in the above summary. There are, of course, additional features of the invention that will be described below and which will form the subject matter of claims. In this respect, before explaining at least one preferred embodiment of the invention in detail, it is to be understood that the invention is not limited in its application to the details of the construction and to the arrangement of the components set forth in the following description or as illustrated in the drawings. The invention is capable of other embodiments and of being practiced and carried out in various ways. Also, it is to be understood that the phraseology and terminology employed herein are for the purpose of description and should not be regarded as limiting.

In FIG. 1, there is shown a natural draft pellet stove in accordance with one embodiment of the present invention. The stove uses a unique configurable burn chamber having an adjustable primary burn basket, an adjustable secondary burn plate, and an adjustable tertiary burn plate. This configurable burn chamber is used in conjunction with a gravity-fed and natural draft system as applied to the operation of a pellet stove for use in home, office and general space heating and related utility use.

The stove of FIG. 1 includes a pellet fuel hopper 1 which stores a supply of burnable pellets. The hopper 1 is shaped to direct pellets, by gravity, to a feed tube 8 which houses a primary burn basket 7, the basket being visible in FIGS. 2 and 3. Control of the flow of pellets from the hopper 1 to the feed tube 8 is provided by a pellet fuel shutoff gate 6. At the base of the feed tube 8 is a burn chamber 9 which can be accessed via a burn chamber door 10. A smaller porthole and porthole door 11 is provided in the burn chamber door 10.

The burn chamber 9 connects with an air duct system 12 which includes an inlet below the burn chamber that connects to the burn chamber 9. Extending from the burn chamber 9 is a heat tube 5 that extends upwardly and parallel to the side of the hopper 1, from the burn chamber 9, through a number of angled sections, to a chimney connector 3. The chimney connector can be connected to any suitable flue or chimney arrangement for venting the burn chamber exhaust to an exhaust area, such as an area outside of the premises in which the stove is installed. The chimney arrangement is not considered a component of the stove, being largely dependent on the particular premises, and thus no further description of the chimney arrangement is considered necessary herein.

A heat shield 2 protects the hopper 1 from the heat radiating from the heat tube 5. One or more air deflectors 4 may be provided above the sections of the heat tube 5 to deflect heated air from around the heat tube towards a heated space of the premises.

The stove is supported by a support stand 13.

Figure 2:
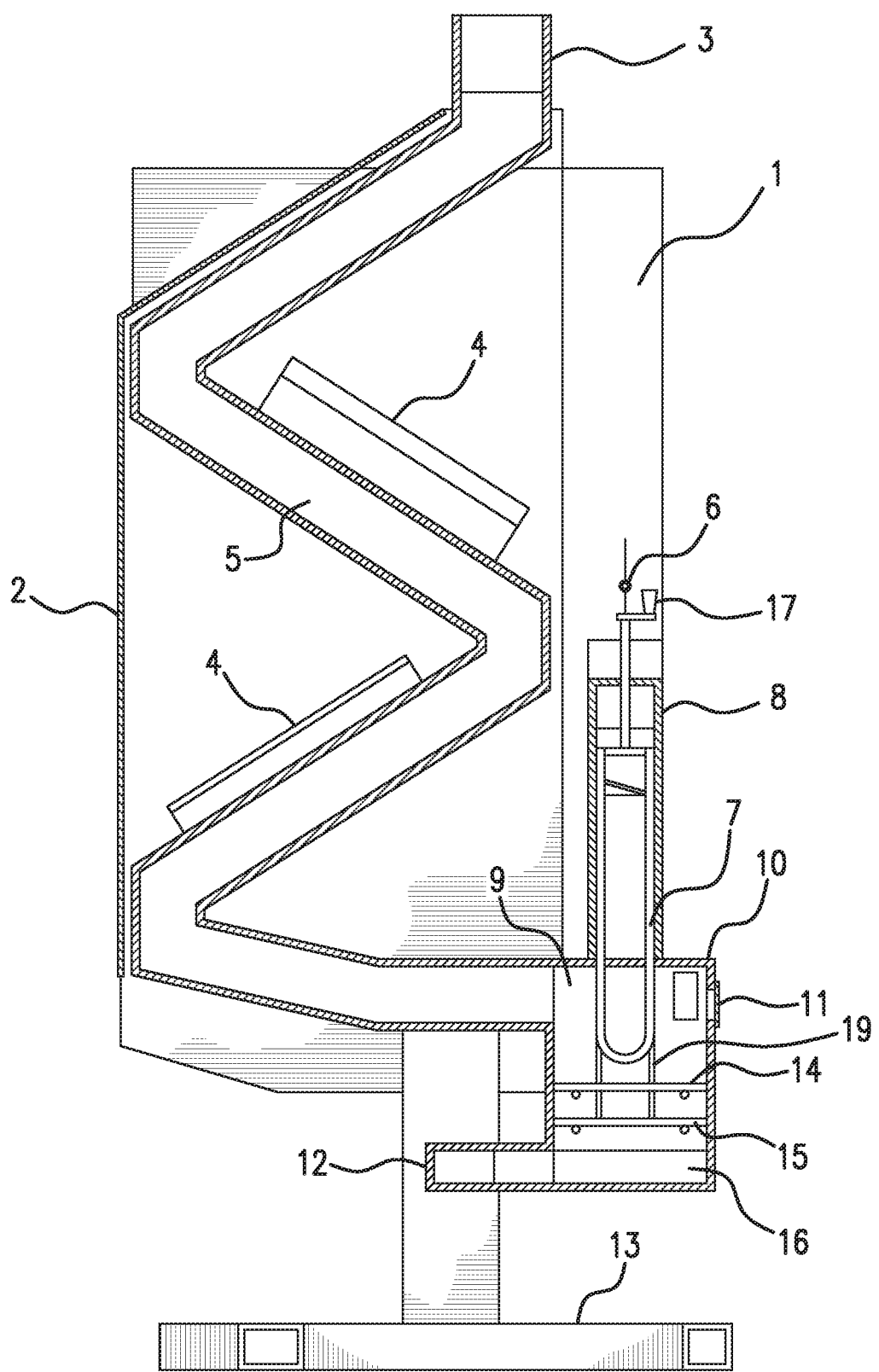
FIG. 2 is a cross-sectional side view of the pellet stove of FIG. 1, taken along the lines 2-2 of FIG. 1.

FIG. 2 shows an internal view of some of the components of the stove, in particular the components of the primary burn basket 7, a secondary burn plate 14 below the primary burn basket, a tertiary burn plate 15 below the secondary burn plate 14 and an ash pan or tray 16 below the tertiary burn plate 15. These components are shown in more detail in FIG. 3.

Prior art stoves using gravity feed and natural draft use a fixed primary burn basket. This fixed primary burn basket contains the same amount of pellet fuel on a high heat burn as it does on a low heat burn. These stoves try to control the amount of heat the stove is generating by slowing the natural draft, causing less air to pass over the primary burn basket. This method slows the burn and reduces the heat output, but also allows the pellet fuel to burn at a lower temperature, creating a burn that is not as clean as a higher-temperature burn using less pellet fuel.

The primary burn basket 7, of the embodiment of the present invention represented in FIGS. 1-3, extends upwardly into the feed tube 8 and is adjustable. It can be lowered, exposing more pellets to the flame and air flow for a high temperature burn, or it can be raised, to allow fewer pellets to be exposed to the flame and air flow for a low temperature burn. The height of the primary burn basket may be set by turning handle 17, in the direction of the arrow at the top of FIG. 3, which in turn rotates a threaded stem 18 on which the primary burn basket 7 is supported. The threaded stem may engage a thread in a lid or cover of the feed tube 8. Alternatively, a lockable sliding stem may set the height of the primary burn basket.

How much heat is generated by the stove is controlled by how many pellets are exposed to the flame and air flow. Using fuel burn rate instead of restricting air flow to the burn area, to set the temperature of the stove, is a more stable and repeatable way of controlling the heat range while maintaining fuel efficiency and reducing emissions. With the presently described arrangement, the pellets receive all the air they can consume, thus maximizing the efficiency of the stove.

The ability to adjust the amount of pellets exposed to the burn also allows the spacing of the bars defining the primary burn basket 7 to be reduced, thereby keeping the pellets in the primary burn basket 7 longer, so they complete more of their total burn while they are still in the basket 7. If more heat is needed, more pellets can be exposed to the flame and air flow by lowering the primary burn basket 7.

Keeping the pellets in the primary burn basket 7 longer, where they complete more of their total burn, allows the pellets to be smaller when they drop to the secondary burn plate 14. Being farther along in their total burn process when they hit the secondary burn plate 14 means that the pellets spend less time on the secondary burn plate 14 before dropping down to the tertiary burn plate 15, thereby reducing pellet buildup on the secondary 14 and tertiary 15 burn plates.

The secondary 14 and tertiary 15 burn plates are located directly below the primary burn basket 7. In the embodiment shown in FIGS. 1-3, the secondary 14 and tertiary 15 burn plates are constructed of round rods arranged parallel to each other. Both burn plates resemble an oven rack used in a kitchen oven. The parallel rods are spaced a specific distance apart. The burn plates could be constructed of other kinds of members, and are not limited to rods.

The roundness of the rods makes it more difficult for the burning pellets to sit in a specific location without falling through the spaces between the rods to the next level as they burn down and become smaller. The length of time the burning pellets sit on the secondary 14 and tertiary 15 burn plates is determined by the spacing of the rods defining these burn plates. The wider the spacing between rods, the less time the burning pellets stay on the secondary 14 and tertiary 15 burn plates before burning to a size small enough to fall through to the next level. The smaller the spacing between the rods, the more time the burning pellets stay on the secondary 14 and tertiary 15 burn plates before burning to a size small enough to fall through to the next level.

After burning to a size small enough to allow the pellets to pass through the secondary burn plate 14, the burning pellets drop through to a tertiary burn plate 15 located directly below the secondary burn plate 14.

The tertiary burn plate 15 is very similar to the secondary burn plate 14, as it is made of round rods which are generally parallel to each other. The spacing of the tertiary burn plate 15 rods is smaller than the spacing on the secondary burn plate 14 rods so the pellets have additional time to complete the burn process before dropping into the ash pan 16. This difference in spacing is illustrated by the detailed view of FIG. 3A, which shows that the spaces between the bars of the tertiary burn plate 15 are smaller than the spaces between the bars of the secondary burn plate 14.

Using secondary 14 and tertiary 15 burn plates allows time for the burning pellets to complete their burn before dropping into the ash pan 16. Spending time on each burn plate keeps the secondary burn plate 14 from backing up with burning pellets which reduces the draft and/or plugs up the stove causing the pellets to smoke, smolder, and become extinguished.

The secondary 14 and tertiary 15 burn plates are located close to the primary burn basket 7, allowing the secondary 14 and tertiary 15 burn plates to be exposed to the higher heat coming from the primary burn basket 7. Being close to the primary burn basket 7 also allows the burning pellets on the secondary 14 and tertiary 15 burn plates to be exposed to more air movement caused by the natural draft. Both a hotter location and more air movement help the burning pellets on the secondary 14 and tertiary 15 burn plate to burn faster, more completely, and with fewer emissions.

In one embodiment, the secondary 14 and tertiary 15 burn plates can be set in adjustable locations either closer or farther from the primary burn basket 7. For example, the secondary and tertiary burn plates may be slidable in and out of a support rack with multiple racks at various heights. The secondary 14 and tertiary burn plates may be accessed and removed through the burn chamber door 10. Having secondary 14 and tertiary 15 burn plates that are removable by sliding in and out allows for easy servicing, as well as for exchanging the secondary 14 and tertiary 15 burn plates with an alternate set of secondary 14 and tertiary 15 burn plates with a different spacing between the rods. Secondary 14 and tertiary 15 burn plates having different rod spacing can be substituted as needed if hardwood pellets are used or if a lesser than premium grade of pellets are used, and the time the burning pellets need to spend on the secondary 14 and tertiary 15 burn plates changes.

In one embodiment, and as represented in FIGS. 1-3, one or both of the secondary 14 and tertiary 15 burn plates may be mechanically attached to the primary burn basket 7, such that the burn plate(s) move upwardly and downwardly with the primary burn basket 7. FIGS. 2 and 3 show that the secondary and tertiary burn plates are attached to the basket by rods 19. Mechanically tying the secondary 14 and tertiary 15 burn plates to the primary burn basket 7 keeps the distance between the primary burn basket 7 and the secondary 14 and tertiary 15 burn plates the same during hot temperature burns and low temperature burns as the primary burn basket 7 is raised up and down. The secondary 14 and tertiary 15 burn plates may be attached to the primary burn basket 7 via racks with multiple levels that allow the spacings between the primary burn basket 7 and secondary 14 and tertiary 15 burn plates to be adjusted.

The stove uses solid fuel pellets for fuel, a gravity-fed pellet delivery system to move the pellet fuel from the storage area in the hopper through the feed tube and into the primary burn basket, and a natural draft created by the energy of the burning pellet fuel to move air past the burning pellets. No electronics, combustion fans, convection fans, or auger motors are required.

To light the stove, the adjusting handle 17 for the primary burn basket 7 is turned until the basket has been moved down to the high heat position (i.e. with most pellets exposed) with the pellet fuel shut off gate 6 in the closed position. A heat gun or propane torch (not shown) may be inserted through the porthole 11 to preheat the exhaust tube for several minutes.

After several minutes of preheating the exhaust/heat tube 5, the pellet fuel shut off gate 6 is opened, causing the pellet fuel to fall, by gravity, into the feed tube and fill the primary burn basket 7.

One continues to apply heat with a heat gun or propane torch until the pellet fuel ignites and the natural draft is established. When the pellet fuel ignites and the natural draft is established, it may be possible to hear the sound of the heated air moving up the exhaust/heat tube 5.

After the pellet fuel ignites and the natural draft is established, one continues to heat the pellet fuel in the primary burn basket 7 with the heat gun or propane torch for approximately 10 seconds, and then removes the heat gun or propane torch. After a few minutes, one closes the porthole door 11.

The pellet fuel will continue to burn in the primary burn basket 7 until the pellet size burns down to a diameter small enough to allow the burning pellets to drop through the spacing between the primary burn basket bars 7. The smaller burning pellets drop through the spaces between the primary burn basket bars down to the secondary burn plate 14 where the pellets continue to burn.

The pellets will continue to burn on the secondary burn plate 14 until they burn down to a size small enough to allow them to drop though the spaces between the bars of the secondary burn plate 14. The smaller burning pellets drop through the spaces between the bars of the secondary burn plate 14, to the tertiary burn plate 15, where the pellets continue to burn. When the burning pellets reach the tertiary burn plate 15, they complete their burn, with the ash falling into the ash pan 16.

After lighting the stove, one continues to run the stove on high heat for a minimum of 30 minutes to burn out any creosote and to ensure the burning pellets in the primary burn basket 7 have stabilized into a complete burn.

After operating the stove at high heat for 30 minutes, the heat output may be adjusted to the desired heat range by moving the adjusting handle 17 for the primary burn basket until the basket is in the medium high, medium, medium low, or low position.

Moving the adjusting handle 17 such that the primary burn basket moves up reduces the number of pellets exposed to the burn in the primary burn basket 7, decreasing the heat output of the stove. Moving the adjusting handle such that the primary burn basket moves down increases the number of pellets exposed to the burn in the primary burn basket 7, thereby increasing the heat output of the stove.

In the embodiment of FIGS. 1-3, the secondary 14 and tertiary 15 burn plates are mechanically attached to the primary burn basket 7. When the primary burn basket 7 is adjusted up or down, the secondary 14 and tertiary 15 burn plates move with the primary burn basket 7, keeping the distance constant between the primary burn basket 7, the secondary burn plate 14, and the tertiary burn plate 15.

The secondary 14 and tertiary 15 burn plates are removable for servicing and replacement. The secondary 14 and tertiary 15 burn plates supplied with the stove are set with spacing between the bars on the secondary 14 and tertiary 15 burn plates for premium grade softwood pellets.

If hardwood pellets or less than premium grade pellets are used, alternative secondary 14 and tertiary 15 burn plates with different spacing may be required.

The stove is shut off by closing the pellet fuel shutoff gate 6. When the remaining pellets located in the feed tube 8 burn up, the stove will shut down.

The pellet fuel only burns in the primary burn basket 7, the secondary burn plate 14, and the tertiary burn plate 15. No pellet fuel is burned in the feed tube 8 due to the pellet fuel being packed in the feed tube 8 and not allowing sufficient oxygen in to support the burning of the pellets.

As the hot exhaust gases move up the exhaust/heat tube 5 and out the chimney connector 3, heat is transferred from the gases to the metal exhaust/heat tube 5. The convection heating process then moves the heat out into the room. The heat shield 2 and air deflectors 4 help to direct the hot air coming from the exhaust/heat tube 5 out into the room and away from the stove.

As the pellet fuel burns in the main burn chamber 9, a natural draft is created moving air from outside the stove across the primary burn basket 7, secondary burn plate 14, tertiary burn plate 15, and out and up the exhaust/heat tube 5. Air flow to support the natural draft is supplied through the air duct system 12. Air duct ports are located at the bottom back and upper front sides of the burn chamber 9. The air duct system can be configured to receive air from inside the building or the air duct system can be attached to an outside air supply based on the local building codes established in the location where the stove is installed.

The pellet stove as described herein provides a highly adjustable and configurable system that can take into account variations in fuel grade, material as well environmental factors. One particular factor is the primary burn basket may be adjusted up or down to compensate for burn conditions at different altitudes as well as adjusting the amount of heat generated by the stove. Another particular factor is the secondary and tertiary burn plate spacing can be changed to compensate for fuel grade and material ensuring that a strong secondary burn can occur without clogging the air flow.

The tertiary burn plate should be considered optional, as it is also feasible to provide a pellet stove having only an adjustable basket and a secondary burn plate.

As noted above, the pellet stove of the present invention does not use electricity, so the stove will continue to operate in conditions of power outages. There are no electronic components, or fans or motors, to be serviced or replaced. The operation of the stove is therefore very quiet.

The stove of the present invention works similarly to a wood-burning stove, but the burn is much cleaner, so the stove of the present invention is more likely to comply with governmental restrictions on the use of wood stoves.

Figure 5:
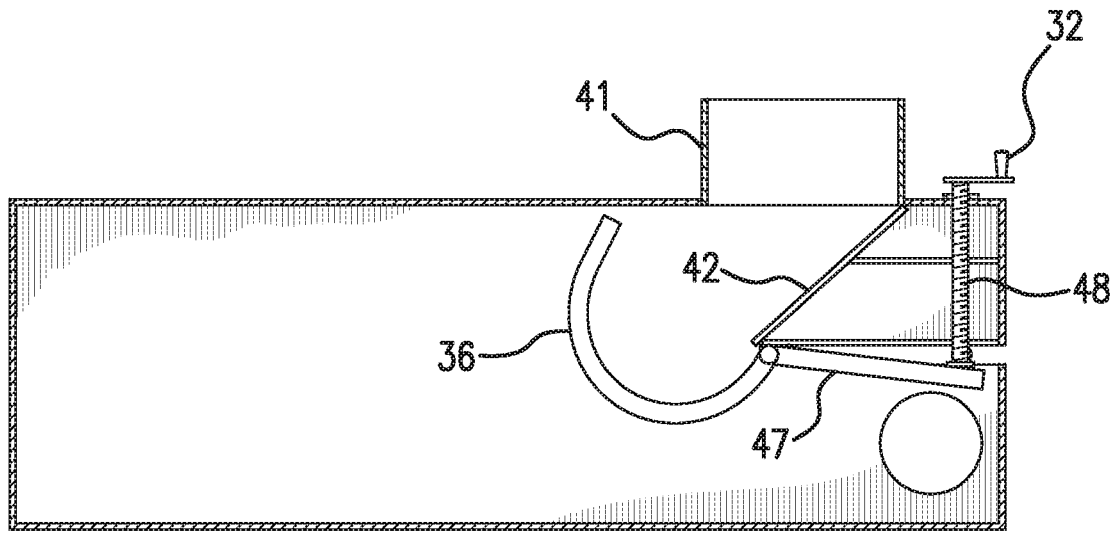
FIGS. 5 and 6 provide cross-sectional views of the burn tube of the embodiment of FIG. 4, showing the movement of the burn basket.
Figure 6:
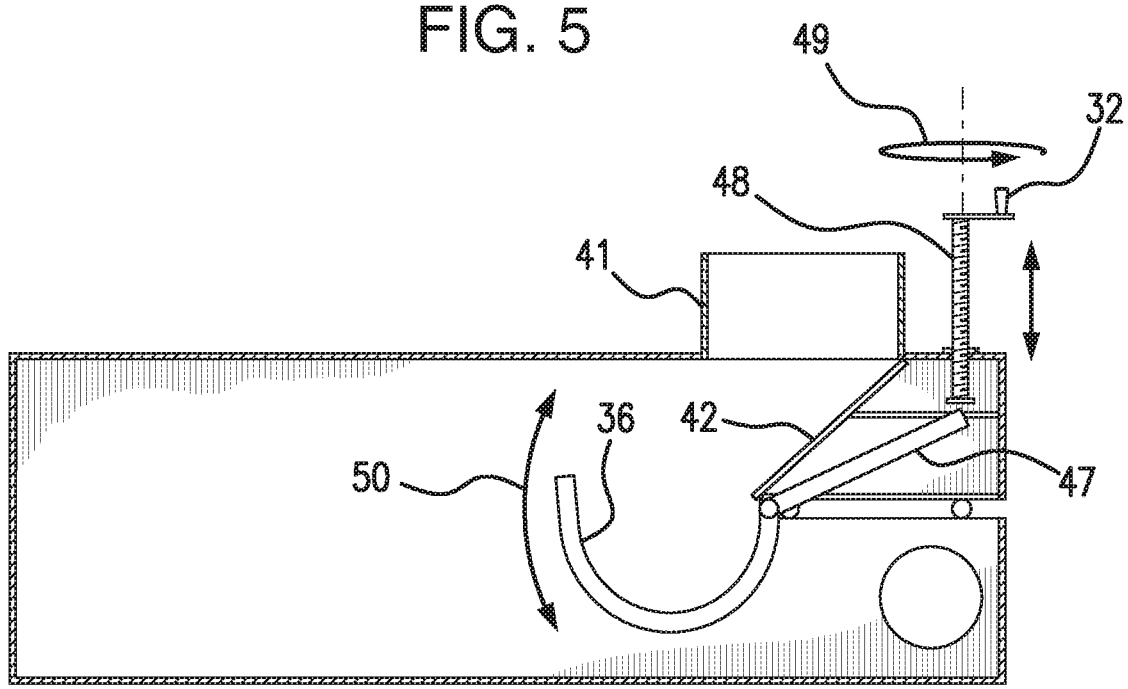
Figure 7:
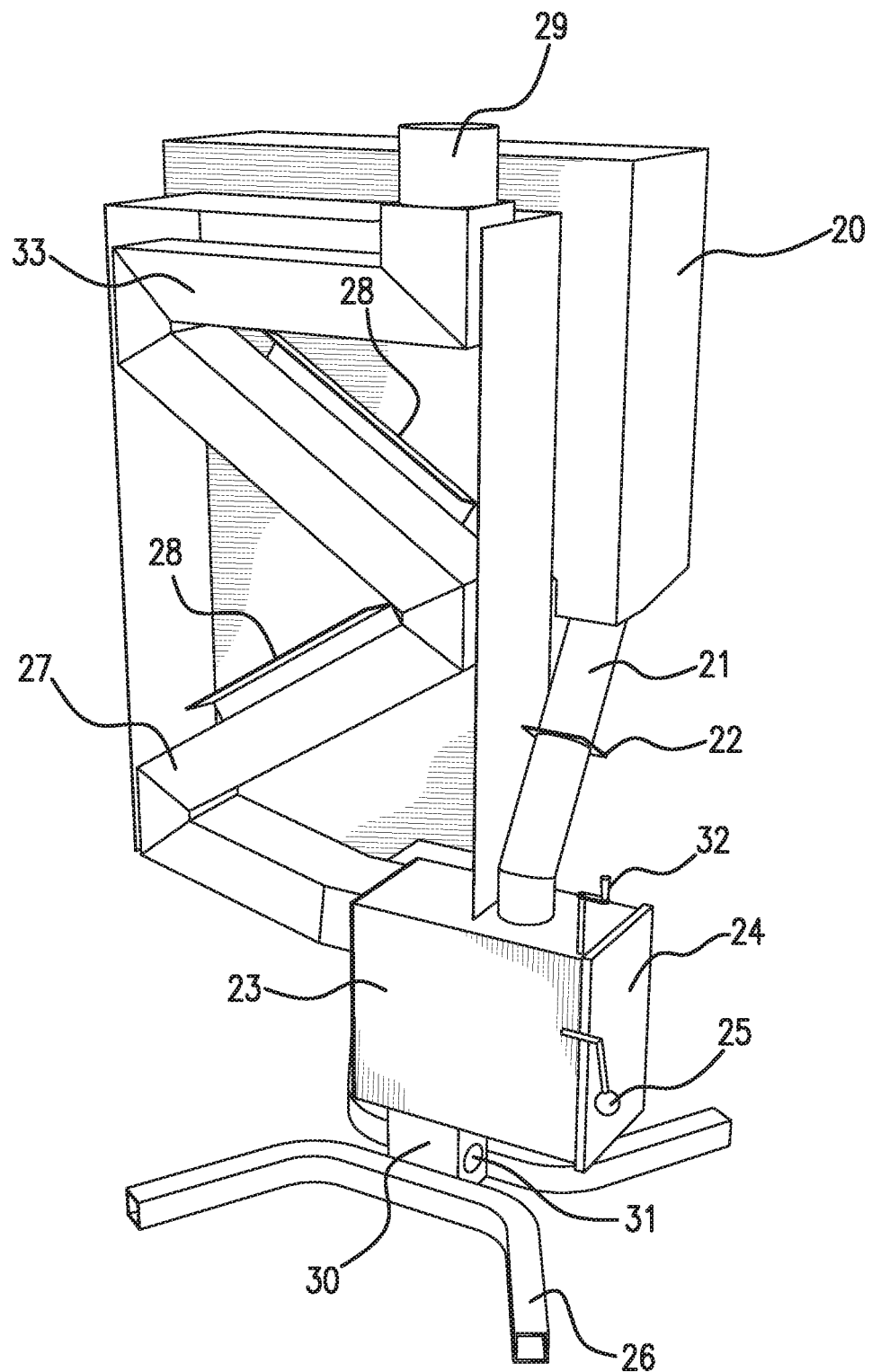
FIG. 7 provides a perspective view of the embodiment of FIG. 4.

FIGS. 4-7 illustrate another preferred embodiment of the present invention. The perspective view of FIG. 7 shows this embodiment from the outside, and FIGS. 4-6 better illustrate the internal components.

Figure 4:
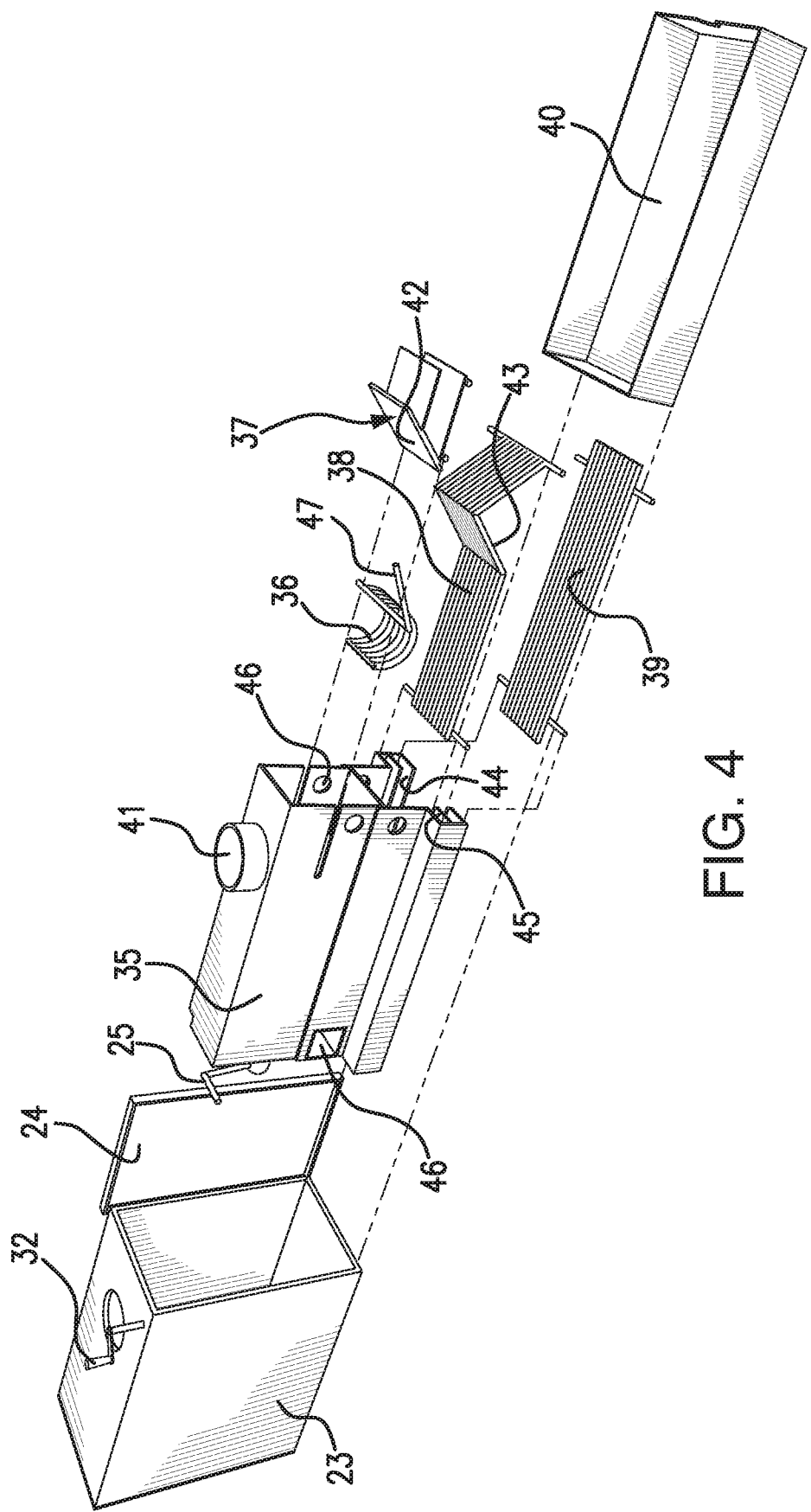
FIG. 4 provides an exploded perspective view of an alternative embodiment of the present invention.

As shown in FIG. 7, the pellet stove includes hopper 20, which is connected to transfer tube 21 having shutoff gate 22. The shutoff gate opens and closes a path, within the transfer tube, to the flow of pellets from the hopper. The transfer tube 21 is connected to burn chamber 23. The internal components of the burn chamber are shown in FIGS. 4-6 and will be described later.

The burn chamber includes door 24 which can be opened and closed by moving handle 25. The stove is supported by stand 26.

The pellet stove includes exhaust or heat tube 27, and air deflectors 28 positioned along segments of the heat tube. The heat tube terminates at chimney connector 29, which connects to a chimney (not shown) or other means for disposing of exhaust gas. Support leg 30 for the burn chamber includes an air inlet 31, similar to that of the first embodiment. Basket adjuster 32 controls the position of the basket, in a manner to be described later.

In the embodiment of FIGS. 4-7, the top section 33 of the heat tube is horizontal, i.e. parallel to the floor, and not at an angle, as was the case in the first embodiment. This feature allows the operator to use this flat area to heat coffee, water, and food. A heat shield can be provided along the top section 33, and such heat shield could be hinged, allowing it to be in place, close to the top section 33, during normal use, and to be swung upward and out of the way when the top section is being used for heating food and the like.

The exploded view of FIG. 4 shows the internal components of the burn chamber. All of the internal components are contained within burn chamber 23, which includes door 24, having handle 25, and basket adjuster 32. These components include burn tube 35, basket 36, slide 37, secondary burn plate 38, tertiary burn plate 39, and ash tray 40. When the components are installed, the basket 36, the slide 37, and the secondary and tertiary burn plates 38 and 39 are positioned within the burn tube 35, and the ash tray 40 sits under the burn tube but inside the burn chamber 23.

The burn tube 35 includes fitting 41 for connection of the burn tube 35 to the transfer tube 21, to permit entry of the pellets into the burn tube.

It can be seen, from FIG. 4, that when the components are assembled, the basket 36 does not sit directly below fitting 41, but instead will be laterally offset (to the left, in FIG. 4). Pellets falling through fitting 41 do not directly reach the basket, but instead hit slide 37, which comprises an angled surface 42 for deflecting the pellets. Pellets hitting the angled surface 42 are deflected into basket 36.

When the pellets burn down so that they can fall through the bars defining the basket, the pellets fall onto the secondary burn plate 38. The secondary burn plate is similar to that of the first embodiment, except that secondary burn plate has an angled portion 43 which causes pellets falling onto the secondary burn plate to be deflected, and to be grouped together in one general location on the secondary burn plate.

Pellets which then burn down to a smaller size may fall through the bars defining the secondary burn plate, onto the tertiary burn plate. The bars of the tertiary burn plate may have a spacing which is smaller than that of the secondary burn plate, as is true for the first embodiment. The pellets falling through the bars of the tertiary burn plate are collected in ash tray 40. Thus, the ash tray receives the residue of pellets, after they have burned down to a predetermined size.

The secondary and tertiary burn plates are held within burn tube 35, by shelves 44 and 45. The burn tube also includes openings, such as openings 46, which comprise ducts for combustion air. The exact shape of the ducts can be varied considerably; what is desired is that air be conducted from the outside, into the interior of the burn tube, to support the combustion therein.

As in the first embodiment, the tertiary burn plate is optional. If the tertiary burn plate is omitted, then pellets drop from the secondary burn plate directly into the ash tray.

FIGS. 5 and 6 illustrate the control of the position of the basket in the second embodiment. Basket 36 is attached to control arm 47. The control arm is engaged by threaded portion 48 connected to basket adjuster 32. The adjuster 32 is turned as indicated by arrow 49 in FIG. 6. Turning the adjuster 32 thereby causes the basket to rotate, in either of the directions indicated by arrow 50. The positions shown in FIGS. 5 and 6 show the extreme positions of the basket. In the position shown in FIG. 5, the basket has been rotated such that it has been moved generally farther from the floor. When the basket is raised up in this position, fewer pellets are allowed in the basket for a lower temperature burn. In the position shown in FIG. 6, the contents of the basket are closer to the floor. When the basket is lowered in this position, more pellets are allowed in the basket for a higher temperature burn. Thus, the movements of the basket, shown in FIGS. 5 and 6, change the amount of pellets allowed in the basket and cause the contents of the basket to be moved into, or out of, the region of the most intense heat.

Note also that FIGS. 5 and 6 further illustrate the offset position of the basket 36 relative to the fitting 41. It can be seen most clearly, in FIGS. 5 and 6, that pellets falling through fitting 41 will generally impact angled surface 42 of the slide before falling into the basket.

In the embodiment of FIGS. 1-3, the basket is rigidly attached to the secondary and tertiary burn plates. In the embodiment of FIGS. 4-7, there is no comparable attachment, as the basket moves without affecting the position of the burn plates. Indeed, in the embodiment of FIGS. 4-7, the burn plates do not move at all. It is also possible to reconfigure the embodiment of FIGS. 1-3 to remove the connection between the burn plate(s) and the basket, so that the basket can move without moving the plate(s). The latter alternative should also be deemed within the scope of the present invention.

The spacing between the bars of the burn plates can be changed by replacing one or more burn plates with another component having a different spacing. In the embodiment of FIGS. 4-7, such adjustment is made easier by the fact that the burn plates slide into, or away from, shelves formed in the burn tube.

Figure 8:
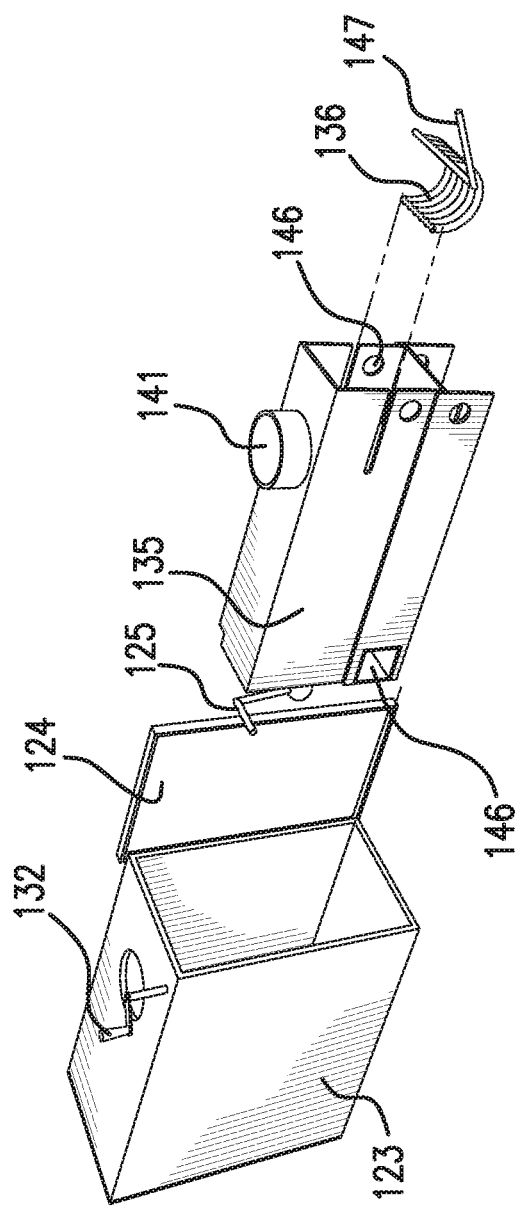
FIG. 8 provides an exploded perspective view, similar to that of FIG. 4, showing an embodiment in which the burn plates, the slide, and the ash tray are omitted.
Figure 9:
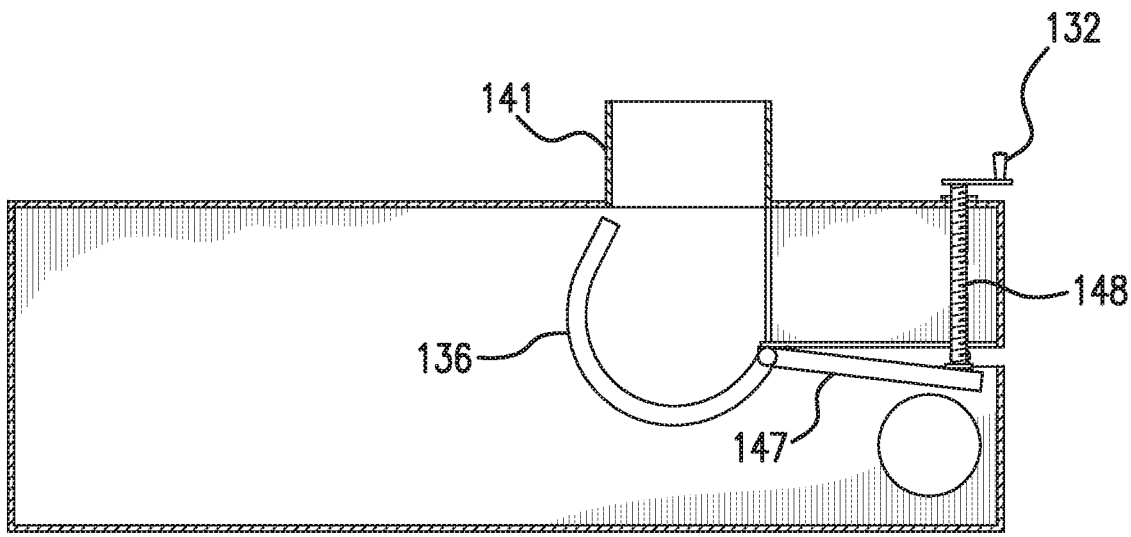
FIGS. 9 and 10 provide cross-sectional views, similar to those of FIGS. 5 and 6, showing an embodiment in which the slide has been omitted.
Figure 10:
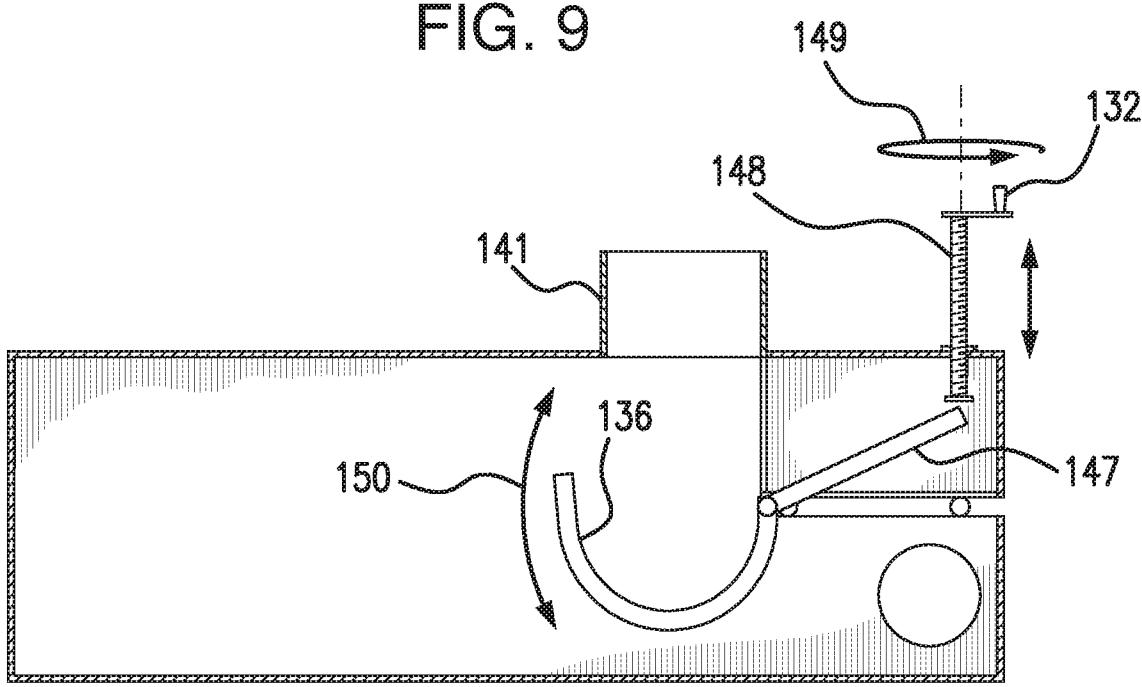

FIGS. 8-10 illustrate further preferred embodiments of the present invention.

The burn plates, the slide, and the ash tray can all be omitted, as shown in the embodiment of FIG. 8. FIG. 8 shows burn chamber 123 which receives burn tube 135. The burn tube includes fitting 141 for receiving pellets from a hopper, and openings 146 for allowing combustion air to flow in the burn tube. The burn chamber includes door 124, operated by handle 125. Basket adjuster 132 is positioned to move control arm 147, attached to basket 136.

As shown in FIG. 8, there is no burn plate, no slide, and no ash tray. When the pellets in the basket 136 burn down sufficiently, the residue falls through the members defining the basket, directly onto the floor of the burn chamber. The floor of the burn chamber may thus serve as an ash disposal area. The residue of the pellets may be removed manually. The pellets are dispensed from a position above the basket, to insure that they fall into the basket. This embodiment includes the case in which the pellets are dispensed from a position directly above the basket, and the case in which a dispensing device is offset from the basket. As explained above, if the dispensing device is offset, the pellets could be directed into the basket by a slide or other device.

In another alternative, one could omit any of the burn plates, the slide, and the ash tray. Thus, the invention could have one or two burn plates, or no burn plates at all, and could be constructed with or without a slide, and with or without an ash tray. All of such combinations are intended to be included within the scope of the present invention.

FIGS. 9 and 10 correspond, respectively, to FIGS. 5 and 6, and illustrate an embodiment in which there is no slide. As in the embodiment of FIGS. 5 and 6, a basket adjuster 132 is turned, thereby turning threaded member 148, and thereby adjusting the position of control arm 147 for basket 136. When the basket adjuster 132 is rotated, as indicated by arrow 149 in FIG. 10, the threaded member moves, in longitudinal translational motion, and thus moves control arm 147, which causes basket 136 to rotate, as shown by arrow 150. The pellets (not shown in FIGS. 9 and 10) are dispensed into fitting 141, from a position above that fitting. The fitting is positioned above the basket, to insure that the pellets fall into the basket.

The present invention should not be deemed limited to the specific arrangements described above. The invention may be modified in various ways, as will be apparent to those skilled in the art. Such modifications should be considered to be within the spirit and scope of the following claims.

What is claimed is:

1. A pellet stove, comprising:
a) a hopper for storing a plurality of pellets comprising fuel for the stove,
b) a basket defining a plurality of openings through which pellets of a predetermined size can fall,
c) means for adjusting a position of the basket, the adjusting means comprising means for varying an amount of pellets allowed in the basket and for causing contents of the basket to be moved into, or out of, a region of the most intense heat,
d) means for conveying air to a vicinity of the basket, to support combustion of pellets in the basket, and
e) means for conducting heated air away from the vicinity of the basket.

2. The pellet stove of claim 1, further comprising an ash disposal area positioned to receive residue of burned pellets which fall through the basket.

3. The pellet stove of claim 1, wherein the stove includes a support stand, and wherein the adjusting means comprises means for moving the basket towards or away from the support stand.

4. The pellet stove of claim 1, wherein the adjusting means comprises means for rotating the basket.

* * * * *